Oct. 2, 1945.  B. F. LUNDY  2,386,052
DEHYDRATING APPARATUS
Filed Aug. 20, 1942
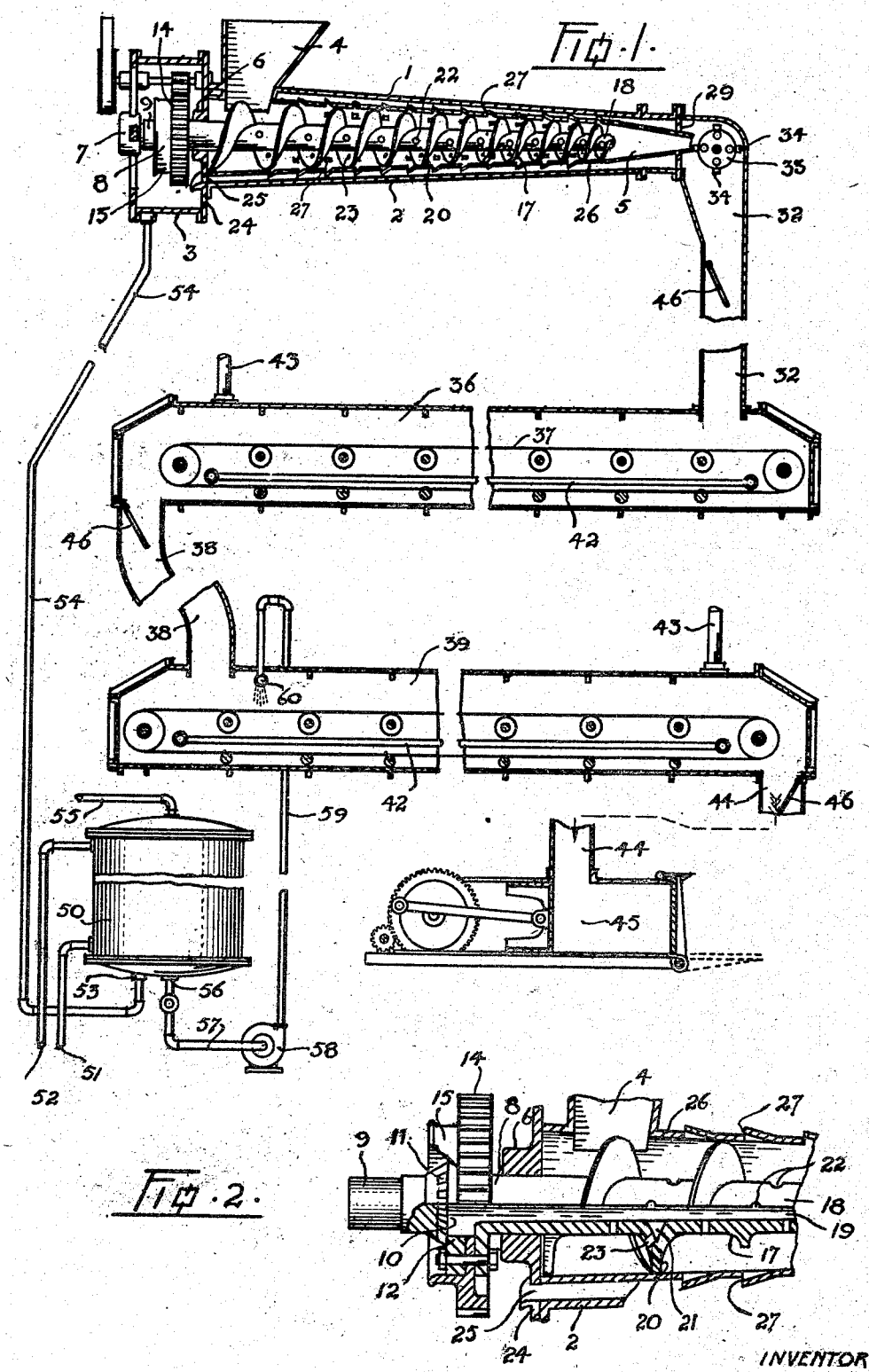
INVENTOR
BERTRAM FAIR LUNDY
Ernest E Carder
ATTORNEY.

Patented Oct. 2, 1945

2,386,052

UNITED STATES PATENT OFFICE 2,386,052

DEHYDRATING APPARATUS

Bertram Fair Lundy, Vancouver, British Columbia, Canada

Application August 20, 1942, Serial No. 455,540
In Canada August 6, 1942

12 Claims. (Cl. 99—235)

My invention relates to improvements in dehydrating apparatus and process, which are particularly adapted for use in dehydrating fibrous or pulpy substances such as peat, vegetables, alfalfa hay, and fruit.

The objects of the invention are to provide means for progressively applying pressure to the product to be treated to extract the bulk of its moisture; to dehydrate the partially dried product by passing same at sub-atmospheric pressure through one or more heated zones and restoring to said product any vitamin containing component which was extracted with the moisture content which was driven off in the primary compressive step of the process. A further object of the invention is to provide means whereby a greater amount of the water content of the product is removed in the first compressive step than is usually obtained.

In describing the invention reference will be made to the attached drawing in which:

Fig. 1 is a diagrammatic sectional view of the invention.

Fig. 2 is a sectional view of the feed screw and liner of the screw press.

In the drawing like characters of reference indicate corresponding parts in each figure.

The numeral 1 indicates generally a screw press having a tapered body 2, a head 3, a hopper 4 and a discharge cone 5. The head 3 is a boxlike structure having bearings 6 and 7 in which are journalled a screw assembly 8 which is shown more particularly in Figure 2. The screw assembly consists of a short shaft 9 rotatable in the bearing 7, which shaft is recessed as at 10 and provided with a plurality of peripheral openings 11 and a flange 12. Fitted to the flange is a gear 14 having a concentric bell 15 which projects beyond the face of the gear and beyond the openings 11 of the shaft 9 and fitted to the gear and the flange 12 is a feed screw 17.

The feed screw 17 consists of a hollow stem 18 having a tapered core 19 and is provided with a helical flight 20 which decreases progressively toward its free end and is internally grooved as at 21. The stem 18 is perforated as at 22 throughout its length between the convolutions of the flight 20 so as to permit the outflow of juices from the product through the core 19 and the openings 11 of the short shaft 9 into the head 3, and the flight is provided with passages 23 which serve the same purpose.

The head 3 is separated from the tapered body by a wall 24 which is provided with an opening 25 communicating with the interspace between the body 2 and the liner 26. The liner 26 is tapered to conform to the taper of the feed screw and is provided intermediate its length with seepage orifices 27 which are preferably formed as detents pressed out of the wall of the liner at such an angle that moisture flowing therethrough will pass in a direction counter to the flow of material through the liner, thus preventing said orifices from clogging.

The discharge cone 5 is provided with a flange 29 which seals the outer end of the body 2 and the length and taper of the cone is such that the material thrust therethrough by the rotation of the feed screw will form an effective lock against the flow of air through the mass.

The discharge end of the screw press 1 is connected by an air tight chute 32 to one or more dehydrating chambers to be hereinafter described. Within the chute 32 is a rotary hammer mill 33 which is driven by any suitable means.

The mill is provided with floating hammers 34 which comminute the material extruded from the discharge cone 5 to a state of appropriate fineness. The chute 32 communicates with a hermetically sealed dehydrating chamber 36 in which is provided an endless belt 37 suitably driven, which carries the ground material to the opposite end of the chamber and allows it to fall into a chute 38 and from thence into another dehydrating chamber indicated by the numeral 39. The chambers 36 and 39 are of similar construction and are provided with similar parts, all of which are indicated by similar numerals. Steam pipes 42 are arranged horizontally below the belt 37 to provide heat for dehydrating purposes and suction pipes 43 are fitted to each chamber which connect with a suitable vacuum pump, not shown, to withdraw the vapours from the chambers and maintain the interior of said chambers at a suitable sub-atmospheric pressure.

While two dehydrating chambers only are shown, it will be understood that a greater number may be used, according to the nature of the material to be processed.

The dehydrating chambers may be rectangular or cylindrical and may be equipped with any desired type of conveyor system without departing from the spirit of the invention.

The chamber 39 is provided with a discharge chute 44 which leads to a baling press 45 or other suitable device. The chutes 32, 38 and 44 are each provided with a pivotally mounted flap 46 which is capable of movement to restrict or otherwise control, the flow of material at various points from the screw press to the baling press 45. These flaps are also designed to substantially close off the air flow in the system, so that if it is desired to maintain a higher vacuum temporarily or an increase in temperature in the dehydrating chamber 36 than in the chamber 39 the flap in chute 38 may be closed.

The numeral 50 indicates a steam heated evaporator of any desired type, which is supplied with high pressure steam through pipes 51 and 52. The evaporator is provided with an inlet 53 connecting with a pipe 54 from the boxlike head 3, a vapour discharge outlet 55 and a liquid extract outlet 56. The outlet 56 communicates through a pipe 57 with a pump 58 which discharges through a riser 59 and a spray pipe 60 extending transversely above the belt 37 of the dehydrating chamber 39.

The operation of the system in dehydrating alfalfa hay would be as follows:

The hay would be fed into the hopper 4 and forced by the rotation of the feed screw 17 lengthwise of the liner and through the discharge cone 5. The pressure exerted upon the material would be increased progressively by the progressive diameter of the liner 26 and the progressive decrease of the pitch of the convolutions of the flights 20. The point of least pressure between the flights is adjacent the stem 18 of the feed screw and the material is obviously urged by the thrust towards the liner wall, consequently the perforations 22 are less subject to clogging than similar sized perforations would be disposed at any other interior wall of the press and permit a continuous flow of expressed juices from the body of the press. The disposition of the seepage orifices 27 in relation to the travel of material through the press substantially prevents clogging, so that the press can be used for extended periods without dismantling and the extraction of juices from the material in the screw press 1 is greater than that obtainable from the conventional type of screw press. The pressed material in extruding from the discharge cone 5 is broken down to a desired fineness or division by the hammer mill, so that it may fall in a substantially even layer on the conveyor belt 37 in the dehydrating chamber 36 by which it is carried and heated to moisture evaporating temperature, so that the water content may be drawn off as it evaporates. The mass, having had its moisture content suitably reduced, is passed through the chute 38 onto the conveyor belt 37 of the chamber 39 for final dehydrating and at this point the concentrate extract of the juices expressed from the hay by the screw press 1 is sprayed onto the substantially dry material. The concentrate is obtained by taking the expressed juices from the head 3, passing them through the evaporator where a suitable proportion of the water content is driven off as steam through the pipe 55 and the remaining liquid, which contains most of the vitamin potencies, mineral salts and other valuable components of the juices are available for return to the dried product. By virtue of the rapid evaporation of the water content and the short time that the concentrate is subject to heat, no deterioration of the vital constituents of the juices takes place, so that the ultimate product is substantially as rich in nutritive value as the original hay treated. The remaining moisture content of the concentrate which is required as a vehicle during the spraying process is evaporated out from the material sprayed therewith during its travel through the dehydrating chamber 39, so that the final product is commercially dry as it is delivered to the baler 45.

Since the only entrance into the air tight chute 32 is through the discharge cone 5, and since, as previously pointed out, the thrust of the compacted material through this long cone effectively prevents the free passage of air into the chute 32 and dehydrating chamber 36, while the baling press 45 blocks the free passage of air up into chute 44 and chamber 39, it is possible to maintain a partial vacuum in the dehydrating chambers, and this may be further controlled by the flaps 46. The maintenance of partial vacuum or reduced air pressure in the dehydrating chambers is an important feature in my invention since it reduces the amount of heat required for the dehydration and enables the desired dehydration to take place in a shorter period of time. This results in less possibility of vitamin loss during the dehydration of the comminuted material.

What I claim as my invention is:

1. A dehydrating apparatus comprising a screw press having a feed hopper and a discharge cone, a dehydrating chamber, a chute extending between the discharge cone and the dehydrating chamber, said dehydrating chamber having an inlet and an outlet, a rotary hammer mill within the chute for comminuting the material passing through the press as it extrudes from the discharge cone, and means for conveying the comminuted material through the dehydrating chamber, said discharge cone forming a support for the mass of the material extruded while being acted upon by the comminuting means.

2. A dehydrating apparatus comprising a screw press having a feed hopper and a discharge cone, a dehydrating chamber, a chute extending between the discharge cone and the dehydrating chamber, said dehydrating chamber being divided into separate zones and having an inlet and an outlet, impact means within the chute for comminuting the material passing through the press as it extrudes from the discharge cone, means for conveying the comminuted material progressively through the separate zones of the dehydrating chamber, and means for separately sealing each zone whereby different pressures or temperatures may be selectively maintained in said zones.

3. Dehydrating equipment comprising a substantially cylindrical body having a boxlike head at one end, a feed hopper and a discharge, a perforated liner within the body, a feed screw within the liner, a shaft and driving gear for the feed screw within the head, said feed screw having a hollow core and perforations communicating between the core and the liner, said shaft having a recess contiguous to the hollow core and peripheral orifices communicating between the core and the boxlike head.

4. Dehydrating equipment comprising a substantially cylindrical body having a boxlike head at one end, a feed hopper and a discharge, a perforated liner within the body, a feed screw within the liner, a shaft and driving gear for the feed screw within the head, said feed screw having a hollow core and perforations communicating between the core and the liner, said core being extended through the gear and means for discharging liquid entering the core into the boxlike head.

5. Dehydrating equipment comprising a substantially cylindrical body having a boxlike head at one end, a feed hopper and a discharge, a perforated liner within the body, a feed screw within the liner, a shaft and driving gear for the feed screw within the head, said feed screw having a hollow core and peripheral outlet orifices communicating between the core and the liner, said core being extended through the gear and means for discharging liquid entering the core into the boxlike head and an annular bell concentric with the gear and extending beyond the peripheral outlet orifices.

6. Dehydrating apparatus comprising a continuous feed press having a discharge opening adapted to express material acted upon in a substantially solid cylindrical air tight mass, a dehydrating chamber having an inlet and an outlet, said inlet being directly connected with the discharge opening, means for disintegrating the mass as it extrudes through said discharge opening, and means connected with the dehydrating chamber outlet for utilizing the material dehydrated to seal said outlet, and thereby enable lower air pressure to be maintained in said chamber.

7. Dehydrating apparatus comprising a feed press and a dehydrating chamber having an inlet and an outlet, said inlet connected with said feed press, means for maintaining a seal at the inlet and the outlet of the dehydrating chamber, whereby to enable a partial vacuum to be maintained in said chamber, means for reducing the air pressure in said chamber, a conveyor extending through the dehydrating chamber, means for extracting liquid from the material fed into the press, means for evaporating some of the extracted liquid, and means for delivering the residue onto the material in the dehydrating chamber.

8. Dehydrating apparatus comprising a feed press adapted to provide a continuous feed and a dehydrating chamber having an inlet and an outlet, said inlet connected with said feed press, means for maintaining a seal at the inlet and the outlet of the dehydrating chamber, whereby to enable a partial vacuum to be maintained in said chamber, a conveyor extending through the dehydrating chamber, a heating media within the chamber, means for reducing the pressure within said chamber below atmospheric pressure, means for extracting liquid from the material fed into the press, means for evaporating some of the extracted liquid and means for delivering the residue onto the material in the dehydrating chamber.

9. Dehydrating apparatus comprising a feed press and a dehydrating chamber having an inlet and an outlet, means for maintaining a seal at the inlet and the outlet of the dehydrating chamber, whereby to enable reduced air pressure to be maintained in said chamber, a conveyor extending through the dehydrating chamber, said dehydrating chamber being divided into connected zones, heating media in some of the zones, means for reducing the pressure within some of the zones below atmospheric pressure, means for extracting liquid from the material fed into the press, means for evaporating some of the extracted liquid, and means for mixing the remainder with the material in one of the zones.

10. A dehydrating apparatus comprising a continuous feed press having a discharge opening, a dehydrating chamber having an inlet and an outlet, means for maintaining a partial vacuum in said chamber, said discharge opening constituting the only entrance to the inlet of the dehydrating chamber, said press being adapted to urge material in solid cylindrical form through the discharge opening in such manner as to form a constant seal between the press and the dehydrating chamber and thereby aid in maintaining the partial vacuum in said chamber, means for comminuting the solid material in the inlet, a conveyor for the material in said chamber, means for compressing material passing through the outlet so as to effect a continuous air seal at the outlet end of said chamber, heating media within the dehydrating chamber, whereby continuous passage of material through said chamber and dehydration of said material under favorable conditions of heat and reduced air pressure can take place.

11. A dehydrating apparatus comprising a continuous feed press having a discharge opening, a dehydrating chamber having an inlet and an outlet, means for maintaining a partial vacuum in said chamber, said discharge opening constituting the only entrance to the inlet of the dehydrating chamber, said press being adapted to urge material in solid cylindrical form through the discharge opening in such manner as to form a constant seal between the press and the dehydrating chamber and thereby aid in maintaining the partial vacuum in said chamber, a conveyor for the material in said chamber, means for compressing material passing through the outlet so as to effect a continuous air seal at the outlet end of said chamber, heating media within the dehydrating chamber, whereby continuous passage of material through said chamber and dehydration of said material under favourable conditions of heat and reduced air pressure can take place.

12. A dehydrating apparatus including a feed press, a dehydrating chamber having an inlet and an outlet, means for maintaining a partial vacuum in said chamber, said feed press discharging into said inlet, the only entrance into said inlet being by way of said feed press, whereby the operation of said press upon material therein will aid in maintaining the partial vacuum in said chamber, a conveyor for material in said chamber, means for compressing material passing through the outlet so as to effect a continuous air seal at the outlet of said chamber and thereby also assist in maintaining the partial vacuum in the chamber, heating media within the dehydrating chamber, the whole apparatus so arranged that continuous passage of material through said chamber and the dehydration of material in said chamber can take place under favourable conditions of heat and reduced air pressure.

BERTRAM FAIR LUNDY.